No. 750,048. Patented January 19, 1904.

UNITED STATES PATENT OFFICE.

HEZEKIAH KIBBE BROOKS, OF BELLOWS FALLS, VERMONT, ASSIGNOR TO CASEIN COMPANY OF AMERICA, A CORPORATION OF NEW JERSEY.

CASEIN COMPOUND AND PROCESS OF PRODUCING SAME.

SPECIFICATION forming part of Letters Patent No. 750,048, dated January 19, 1904.

Application filed March 31, 1903. Serial No. 150,422. (No specimens.)

*To all whom it may concern:*

Be it known that I, HEZEKIAH KIBBE BROOKS, a citizen of the United States, residing at Bellows Falls, in the county of Windham and State of Vermont, have invented or discovered certain new and useful Improvements in Casein Compounds and Processes of Producing Same, of which the following is a specification.

As is well known, casein is at the present time now very largely used in the arts for various purposes—as, for example, in compounds for coating and waterproofing papers, as an adhesive in the manufacture of paper boxes and other purposes, and also as a binder in calcimines and water-paints.

The object of the present invention is to improve the quality of casein to be used for the purposes above indicated and for other purposes—as, for example, where the casein is to be used as a substitute for gum or dextrine as an adhesive and it is desired to give it the quality of absorbing more water when dissolved and to give the solution more body or thickness, so that more surface may be covered by a given quantity thereof, such greater body or thickness for the solution for a given quantity of casein being particularly desirable when such solution is to be mixed with some mineral base, as in calcimines or water-paints, in that it will hold the heavy base material, such as barytes or *blanc fixe*, (precipitate sulfate of barium,) better in suspension without settling.

Another object of the present invention or discovery is to provide a ready oxidized casein in dry commercial form, so that when it is used as a binder in the manufacture of cold-water paints the paint mixture or compound will be quickly oxidized in such a manner as to be weather-resisting without requiring the delay which must occur when lime is mixed with the casein and water for securing the oxidizing action. Thus where lime is mixed with the casein and water in the manufacture of cold-water paints or calcimines the oxidizing action of the lime upon the casein is comparatively slow, and in order to obtain satisfactory results and secure a paint which will be weather-resisting and will withstand atmospheric conditions it is necessary that the paint should be allowed to stand from three to five hours after mixing before being applied to the surfaces to be covered in order that the casein in the paint may be properly oxidized by the action of the lime. This is a great disadvantage in many cases, as there is always more or less tendency of some of the ingredients of the paints to settle, and the delay in waiting for the paint to become oxidized is sometimes quite vexatious.

In carrying the invention or discovery into effect about five per cent. of any suitable oxidizing agent—as, for example, dioxid of potassium or a persulfate, preferably persulfate of ammonia—is added to any suitable grade of dry commercial casein, such addition being preferably effected by first dissolving the oxidizing agent or persulfate in about an equal amount of water, by weight, and then thoroughly incorporating the solution with the dry casein by rapid agitation in any suitable mixer, and when the casein thus oxidized comes from the mixer it is practically dry and can be kept in this condition to be used at any subsequent time.

Although about five per cent. of the persulfate of ammonia or other equivalent oxidizing agent is ordinarily sufficient for the purpose of so oxidizing the casein that when it is used as a binder in paints the latter will be weather-resisting and practically insoluble and will also be sufficient to give the casein the desired body or thickness, the invention is not to be understood as being limited to this proportion of persulfate of ammonia or other equivalent oxidizing agent, as a larger percentage thereof may be employed up to about or somewhat more than twenty per cent., and in such case this larger percentage of the oxidizing agent will render the casein perfectly insoluble. Also the invention is not to be understood as being limited to adding the oxidizing agent to dry casein, as it may be added to the milk before the casein has been precipitated therefrom, the precipitated oxidized casein being afterward dried, with good results, or the oxidixing agent may be introduced into the casein at any stage in the manufacture thereof, as by being combined by any suitable mixing process with casein which has been newly precipitated from milk and before it has been dried to ordinary commercial condition.

Casein which has been oxidized in the manner above described by a colorless agent forms a very clear and transparent solution when dissolved with alkalies or alkaline salts, and this solution when dried out presents a very lustrous and glossy surface similar to that produced by pyroxylin or other varnishes, such as are used for obtaining enameling effects on advertising-cards and other articles.

Having thus described my invention or discovery, I claim and desire to secure by Letters Patent—

1. As an improved manufacture, oxidized casein in dry commercial form.

2. As an improved manufacture, oxidized casein in dry commercial form and consisting of casein and about five per cent. of an oxidizing agent which has been thoroughly incorporated therewith.

3. The herein-described casein compound, consisting of casein and persulfate of ammonia which has been thoroughly incorporated therewith.

4. The herein-described process of producing oxidized casein, consisting in dissolving an oxidizing agent in about an equal amount of water, by weight, and then thoroughly incorporating the oxidizing solution with the casein by stirring the same into the casein during rapid agitation.

5. The herein-described process for producing oxidized casein, consisting in dissolving persulfate of ammonia in about an equal amount of water, by weight, and then thoroughly incorporating the persulfate of ammonia with the casein by stirring the same into the casein during rapid agitation.

In testimony whereof I affix my signature in presence of two witnesses.

HEZEKIAH KIBBE BROOKS.

Witnesses:
 WALTER J. RIDER,
 JOHN REGNIER.